Aug. 26, 1958     F. GYGAX     2,849,660
PROTECTIVE CIRCUIT FOR HIGH TENSION LINES WITH SERIES CONDENSERS
Filed July 1, 1955     2 Sheets-Sheet 1
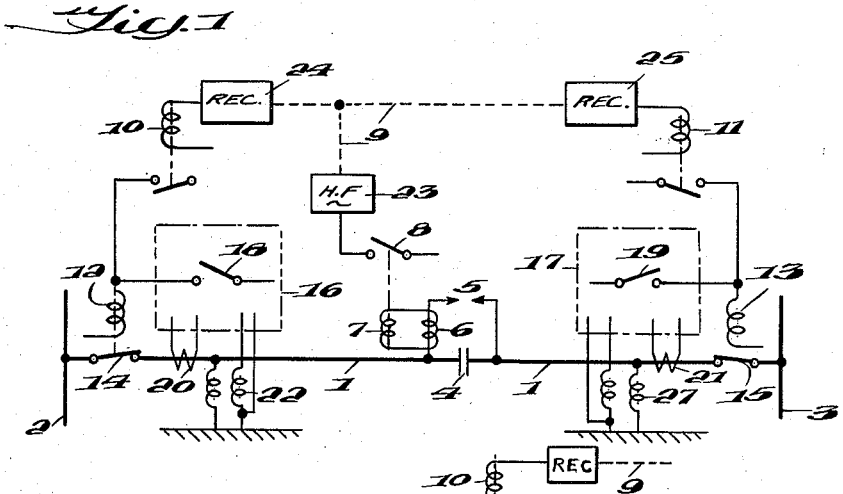
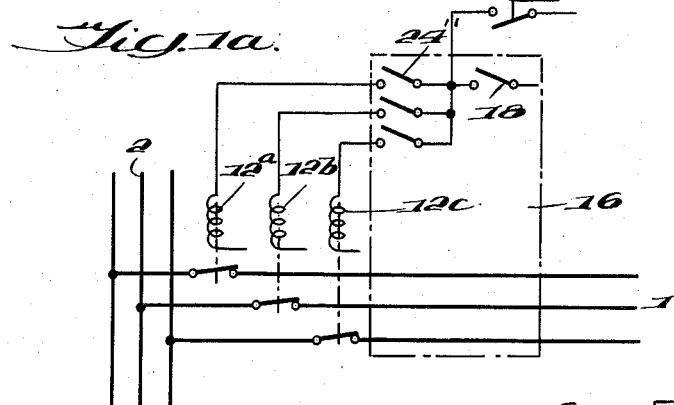
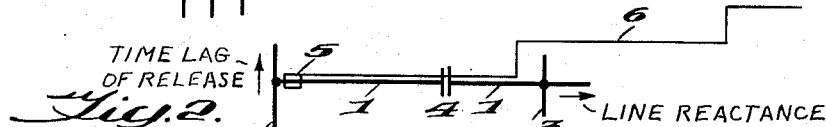
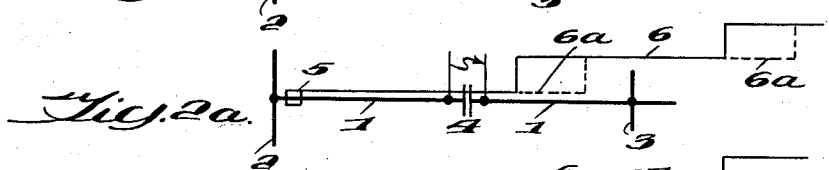
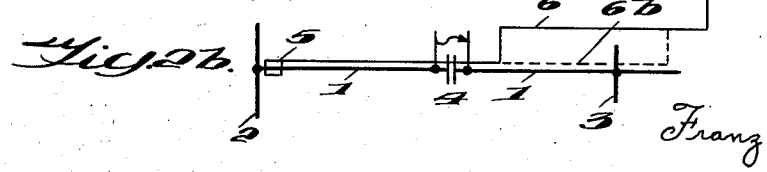
INVENTOR
Franz Gygax
BY Pierce, Scheffler & Parker
ATTORNEYS

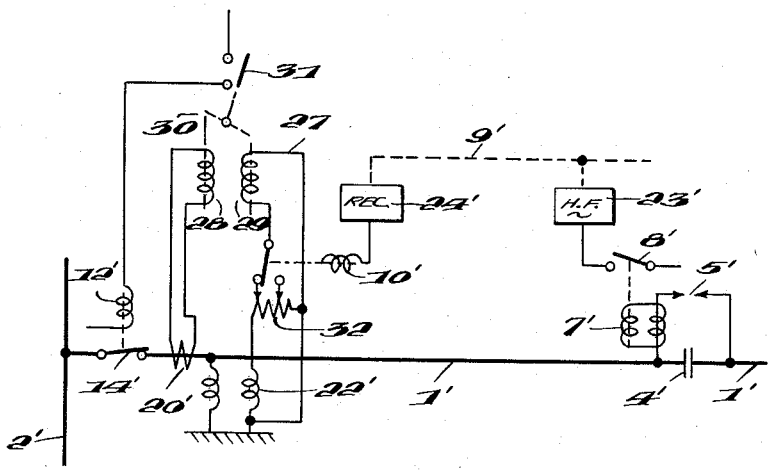
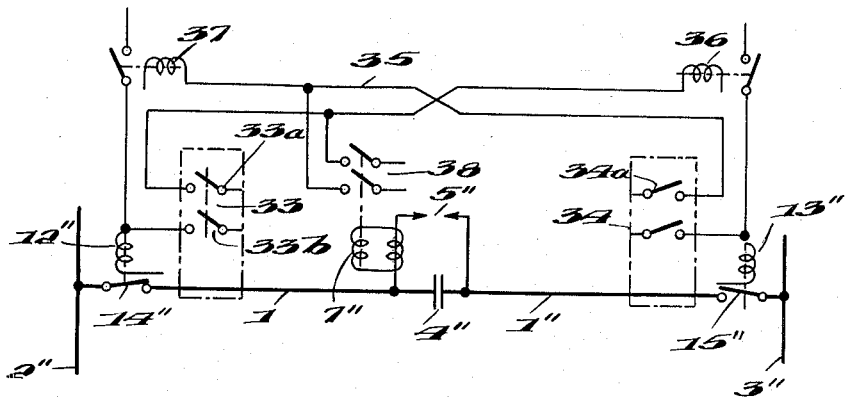

2,849,660

PROTECTIVE CIRCUIT FOR HIGH TENSION LINES WITH SERIES CONDENSERS

Franz Gygax, Ennetbaden, Switzerland, assignor to Aktiengesellschaft Brown, Boveri & Cie., Baden, Switzerland, a joint-stock company Application July 1, 1955, Serial No. 519,589

Claims priority, application Switzerland July 10, 1954

7 Claims. (Cl. 317—29)

It is known that long high tension lines are equipped with series condensers to increase the stability and the transport capacity in order to compensate at least a part of the line-reactance. Very high tensions can occur in these series condensers when short-circuits appear in such lines. These series condensers are provided with dischargers or short-circuit breakers thus eliminating a dimensioning corresponding to said high tensions which do not appear in the normal operation. Thereby it is afforded that series condensers are short-circuited when the condensers are overstrained as a result of short-circuit in the respective line. If short-circuits occur in adjoining of parallel lines there is not desired a short-circuit of the series condensers in order to maintain the full transport capacity in the remaining sound lines. Thus the relays for actuation of the switches effecting the short-circuit of the series condensers are arranged in such a way that the short-circuiting of the series condensers is limited to the particular line on which short-circuits appear.

The protecting devices securing the high tension line disposed at the circuit ends show various reactions depending on the circumstances, namely, whether the series condenser is normally switched in or short-circuited. Distance relays will measure e. g. the fault-location as being shifted farther off when a short-circuit occurs behind the short-circuited series condensers. Thus such distance relays applied in certain defect cases with short-circuited condensers will switch off too late i. e. instead of at basic time, far later at the time lag of a second degree.

The invention relates to a protective circuit for high tension lines with series condensers.

The invention is characterized in that in conjunction with the series condensers there are provided means transmitting a signal to the line protecting devices and putting into operation a relay which in its turn effects regulations on the line protecting devices when the series condensers are short-circuited.

When the series condenser is short-circuited e. g. when a discharge gap in parallel with the condenser is sparked over, or when a switch, situated in parallel with the condenser is closed by means of a maximum-voltage relay there is transmitted a signal at the line-ends whereby a relay is actuated effecting supplementary regulations of the available protecting devices of the line. This regulation can e. g. be effected in such a way that during the removal of faults the protecting devices take into account the occurring short-circuiting of the series condensers. The short-circuiting of the condensers as such can also be used as criterion for a short-circuit in the line. In connection herewith the following regulations can be e. g. effected by the signal:

(a) direct regulations, thus direct switch release at the line-ends, (b) acceleration of the release when increasing the sensitivity of the line-protecting relay, (c) extension of the range of the distance relay, (d) adjustment of the release characteristic of the distance protecting relay to the line when series condensers are short-circuited.

Several practical embodiments of the invention are described hereinafter and illustrated in schematic circuit diagram in the accompanying drawings.

With reference now to Fig. 1 which shows the protective circuit in cooperation with a line protecting relay, a high tension line 1 communicates between two distant stations 2 and 3. For the sake of simplicity, the high tension line is designed as single-phase although normally it is a three-phase line. Condensers 4 are incorporated in series with the high tension line to compensate at least partly the line inductance and thus to increase the carrying capacity. To protect the series condensers against high tensions there are inserted in parallel therewith in each phase, dischargers i. e. arc gaps 5, short-circuiting the respective condensers when said discharger sparks over as a result of an increase in tension. Each discharger is e. g. set up in such a way that it sparks over in the line 1 only in such a case when the tension in the condensers is increased as a result of short-circuit. In the circuit of the discharger 5 there is inserted a maximum current relay 7 energized by the secondary winding of a current transformer 6. The primary of transformer 6 is in series with the discharger 5 and the secondary is pulsed thus actuating relay 7 each time the series condensers are short-circuited as a result of spark-over of the discharger.

The contact 8 of the maximum current relay 7 communicates with the high-frequency generator 23. The high frequency source imparts e. g. under normal line conditions a constant carrier frequency over the high frequency connection 9 to receivers 24 and 25 at both ends respectively of the line 1. The signal relays 10, 11 are linked up respectively with the receivers 24 and 25, said relays being connected with the line protecting devices at both ends of the line. The line protecting devices consist of conventional line protecting relays 16 and 17 to which there are attached respectively the current transformers 20, 21 and the tension transformers 22, 27. The relay releasing contacts 18, 19 communicate with the trip-coils 12, 13 of the line circuit breakers 14, 15 and these contacts 18, 19 are inserted in parallel with the contacts 10a, 11a of relays 10, 11. Energization of trip-coils 12, 13 is thereby effected by line protecting relays 16, 17 and also effected by the signal relays 10, 11 in response to signals transmitted over the connection 9. The signal to relays 10 and 11 arises as a result of interruption of the carrier frequency which is normally continuous to the receivers 24, 25 when the conditions on the transmission line 1 are normal, the interruption being effected by the action of the relay 7 when spark-over appears in the discharger 5. The operating mode of the device is as follows:

If a spark-over appears in the discharger 5 as a result of a short-circuit in the line, the relay 7 is actuated and the contact 8 effects an interruption of the carrier frequency of the generator 23. The arrangement at the re-receivers 24, 25 is such that upon vanishing of the carrier frequency at the receivers 24 and 25 relays 10 and 11 become energized and hence close their contacts 10a, 11a, which in turn effect energization of the trip coils 12, 13 of the line circuit breakers 14, 15 and hence effect opening of the line at circuit breakers 14 and 15. Thus the line is switched off at both ends. The signal to receivers 24, 25 can also consist of the switching on of the carrier frequency at generator 23 instead of the interruption of the carrier frequency. In other words relays 10 and 11 would then be energized whenever a carrier frequency was sent out to the receivers 24, 25 from generator 23 over the line 9. Also a modulation of amplitude or frequency of the carrier frequency can be utilized to transmit to the relays 10 and 11 an indication that the condenser 4 has been bridged by the spark gap 5. The modulation can be effected by means of a low frequency signal tension. The control signal then consists of the vanishing or transmission of this signal tension. In frequency modulation there can be also released a simple frequency modification through the relay 7.

The disengagement of the line can be restricted to individual phases through single-phase short-automatic circuit reclosing instead of in all three phases. In this case a characteristic signal can be transmitted for each individual phase of the high tension line during the short-circuiting of the series condensers so that only that phase is switched off whose series condensers are short-circuited. However, even in this case just only one joint signal can be transmitted heretofore regardless of the conducting phase in which the series condensers were sparked over. In this case the release-command is supplied at the line end of the relay 10 actuated by the signal, instead of directly to the trip-coils 12a, 12b, 12c (Fig. 1a) over the known phase dial-system equipment of the line protection with the contacts 24″.

When the series condensers are short-circuited, the direct disengagement of the line is, under circumstances, not desirable, e. g. if the transmitting medium is too little secure against distorting impulses or if the short-circuiting of the series condensers is not restricted to the short-circuits in the line. In the latter case, the transmitted signal can be used to switch on the protecting equipments. E. g. the release can be accelerated or e. g. adjustments to the line conditions with short-circuited series condensers can be performed in the distance protection.

As already mentioned, the sensitivity of the line protecting relay can be increased for the acceleration of the release. Thus it is possible (as it is known) to by-pass by way of switching individual or several criteria which must be fulfilled by relays for the release. In a line protecting equipment which e. g. includes separate distance-relays and direction-relays there can be by-passed the distance-relay by means of the relay 10 (Fig. 1) actuated by the signal so that only the direction relay must trip for the release in its direction. Or it is possible to effect the release with the relay 10 actuated by the signal, if only the starting switches are tripping in the line protecting equipment.

In distance protecting equipment with zone characteristic there can be extended the distance zones by the relay actuated through the signal. In Fig. 2 there is shown a high tension line 1 with the series condensers 4. communicating with the stations 2 and 3. The curve 6 represents the release characteristic of the distance relay installed at the starting point of the line. The basic time zone is e. g. set up in such a way that it covers about 90% of the line when series condensers are connected to the line. When the series condensers are short-circuited (Figs. 2a and 2b), the line becomes longer as far as its reactance is concerned because the entire line-reactance becomes active. Hence, the basic time zone does not cover 90% of the line but less in accordance with the short-circuited series condensers. The extension of the distance zones during the short-circuiting of the condensers can be performed according to Fig. 2a, curve 6 in such a way that it is adjusted to the line with short-circuited condensers. In this case the basic time zone is expanded to about 90% of the line with short-circuited condensers. To accelerate the release it is also possible to expand the basic time zone beyond the protected line, as indicated by Fig. 2b, curve 6b.

Fig. 3 represents an embodiment for the expansion of the distance zones during the short-circuiting of the series condensers: The line 1′ with the series condenser 4′ communicates the station 2′ with another station, which is not shown. The discharger 5′ lies in parallel with the series condensers 4′. When the series condensers are short-circuited, the maximum current relay 7′ with the contact 8′ transmits a signal to both ends of the line over the high-frequency connection (23′—9′—24′) to trip the relay 10′ at the station 2′. As line protection there is provided a distance, protecting device effecting the distance measuring by means of an impedance scale 27. The impedance scale is fitted with a current coil 28 energized by current transformer 20′ on line 1′ and a voltage coil 29 energized basically from voltage transformer 22′ on line 1′ affecting a rotary system 30. If the line impedance falls below a certain value during short-circuit thus the force of the current coil is predominant and the contact 31 controlled by the rotary system 30 is closed, thus energizing the trip coil 12′ of the line circuit breaker 14. For the adjustment of the trip impedance of the impedance relay to the line characteristic, i. e. for the adjustment of the length of the distance zone, the induction of the voltage coil 29, can be modified, as it is known, by a tapped setting or potentiometer winding 32 in parallel with the transformer secondary winding 22′. In order to expand the distance zone when the series condensers are short-circuited, the tapping on the setting winding 32 is switched by the relay 10′ reacting on the transmitted signal so that the voltage coil 29 of the impedance scale receives a small voltage and thus trips already were smaller current, i. e. with a higher impedance.

The determination of the short-circuiting of the series condensers can be effected by other means instead of with maximum current relay 7′, thus e. g. by means of a minimum impedance-meter or capacitance-meter or any other connections for measurement using the tension in the condensers and the conduction current. Further it is possible to use for the engaging of the transmission signal the relay releasing the short-circuiting of the series condensers by a switch, e. g. a maximum tension relay. In this case, the condenser-short-circuiting switch is excited simultaneously with the signal. However, even an auxiliary contact of the short-circuiting-switch can be used for the introduction or maintenance of the signal.

The transmission of the signal to the line ends can also be effected over an independent high frequency directional beam connection. In addition the transmission of the signal can be effected with direct current, sound frequency or high-frequency over special auxiliary lines.

If between the ends of the line there already exists a signal connection with a channel for the transmission of the trip command, or of switches in the protection equipments as it is desirable in the short-circuiting of the series condensers, it is thus possible to switch directly to this existing channel when the series condensers are short-circuited so that the release or switching at the line ends is performed by the existing apparatus. An embodiment with an auxiliary line is represented in Fig. 4. The high-tension line 1″ with the series condensers 4″ paralleled by discharger 5″ communicates with the stations 2″ and 3″. The line is protected at both ends by the protection devices 33 and 34 whose release is coupled over the auxiliary line 35. If e. g. the protecting equipment 33 of station 2″ trips, it thus locks both trip contacts 33a and 33b. The contact 33b excites the trip coil 12″ of the line circuit breaker 14″ in the specific station and the contact 33a excites the trip coil 13″ of the line circuit breaker 15″ at the other line end over the auxiliary wire connection 35 and the intermediate relay 36. Conversely the circuit breaker 14″ is released by the contact 34a over the auxiliary conduit and the intermediary relay 37 when the protecting device 34 in station 3″ is released. When the series condensers 4″ are short-circuited, there is actuated the maximum current relay 7″ and closes the contacts 38. Thereby the auxiliary line is put under tension and the relays 36 and 37 are actuated which in turn effect the release of the line breakers 14", 15".

If, in the installation of a high tension line, there are inserted several series condenser batteries between two stations, a uniform steering of the protecting equipment at the line ends can thus be performed regardless of the series condenser battery which was short-circuited, or various regulations can be effected depending on the number of the short-circuited series condenser batteries.

If, during the short-circuiting of series condensers, there are effected not only the mode of operation of the protecting equipment of the line itself, but also that of the protecting devices of the attached lines, e. g. if the series condensers are arranged in a station or close to the line end, thus regulations can be performed even on these protecting devices when the series condensers are short-circuited.

On high tension lines automatic reclosing under short-circuit conditions is frequently used. When a fault appears the line is opened for a short time in order that the eventual short-circuit-arc can discharge, whereupon it is then reclosed. If there exists a permanent strong-short-circuit thus this short-circuit becomes active again during the reclosing and the line must be again, this time, permanently switched off. If, during a line short-circuit, the series condensers are short-circuited, thus it is to be expected that after the reclosing, the repeated short-circuit will be followed by repeated short-circuiting of the series condensers. Therefore, it can be desirable for the acceleration of the following second opening that during the reclosing there are installed the protecting devices at the line ends corresponding to the short-circuited series condensers. The regulations performed in the protecting devices during the short-circuiting of the condensers, can be appropriately supplemented with the application of automatic reclosing under short-circuit conditions.

I claim:

1. In a protective arrangement for a high voltage transmission line extending outwardly from a power station, said line including condenser means connected to the line at a point remote from the power station and means such as a spark gap connected in parallel with said condenser means for shunting said condenser means out of the line when overstrained as a result of a short-circuit condition on the line, the improvement which comprises means actuated upon shunting out said condenser means for producing a signal, means transmitting said signal back to said station, and protective means at said station responsive to receipt of said signal for effecting a disconnection of the line at said station.

2. A protective arrangement as defined in claim 1 wherein said protective means at said station comprises a circuit breaker connecting the line to said station, said circuit breaker including a trip coil energized through relay means, and said transmitted signal is applied directly to said relay means thereby to effect energization of the trip coil on said circuit breaker.

3. A protective arrangement as defined in claim 1 wherein said protective means at said station comprises a circuit breaker connecting the line to said station, said circuit breaker including a trip coil energized through relay means, and said transmitted signal is applied indirectly to said relay means by modification of a line impedance measuring device which in turn controls operation of said relay means.

4. A protective arrangement as defined in claim 3 wherein said line impedance measuring device includes a differential relay having a current winding responsive to current in said line and a voltage winding responsive to the line voltage at said station, and means actuated by said transmitted signal for reducing the voltage applied to said voltage winding thereby taking into account the impedance variation on said line caused by the shunting of said condenser means out of said line.

5. A line protective arrangement as defined in claim 1 wherein said protective means at said station comprises a circuit breaker connecting the line to said station, said circuit breaker including a trip coil therefor and a line impedance measuring device, said line impedance measuring device including first relay means actuated thereby to effect energization of said trip coil, and said signal being applied to a second relay means arranged in parallel with said first relay means for likewise effecting energization of said trip coil.

6. A line protective arrangement as defined in claim 1 wherein said means for transmitting said signal back to said station comprises a high frequency generator energized upon shunting of said condenser means and a receiver for the high frequency at said station.

7. A line protective arrangement as defined in claim 1 wherein said means for transmitting said signal back to said station comprises an auxiliary line paralleling said transmission line, said auxiliary line being energized upon shunting out of said condenser means.

References Cited in the file of this patent

UNITED STATES PATENTS

| | | |
|---|---|---|
| 1,335,256 | Petersen et al. | Mar. 30, 1920 |
| 1,831,338 | Brown | Nov. 10, 1931 |
| 2,072,717 | Marbury | Mar. 2, 1937 |
| 2,405,081 | Warrington | July 30, 1946 |